May 1, 1962    O. DOLESCHALEK    3,031,893
DRIVING DEVICE, ESPECIALLY FOR MOTOR VEHICLES
Filed April 1, 1957      2 Sheets-Sheet 2

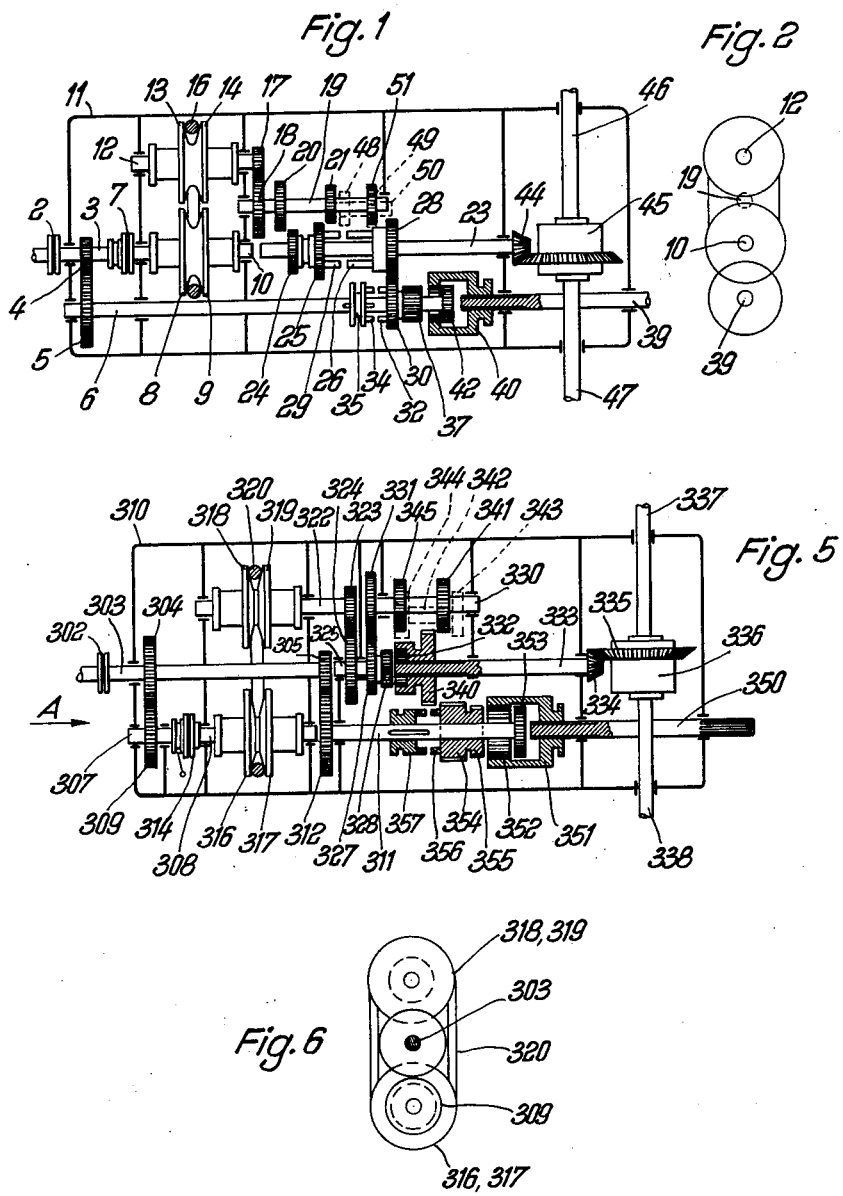

Inventor:
OTTO DOLESCHALEK
By:

United States Patent Office 3,031,893
Patented May 1, 1962

3,031,893
DRIVING DEVICE, ESPECIALLY FOR MOTOR VEHICLES
Otto Doleschalek, Friedrichshafen, Germany, assignor to Zahnradfabrik Friedrichshafen Aktiengesellschaft, Friedrichshafen, Germany
Filed Apr. 1, 1957, Ser. No. 649,929
Claims priority, application Germany Apr. 7, 1956
16 Claims. (Cl. 74—15.6)

This invention relates to change speed transmissions for the traction drive and also for an auxiliary drive for motor vehicles.

Such combination drives are generally utilized in utility trucks, farm machines, and other automotive equipment.

It is an object of the invention to provide a compact arrangement for variable speed transmissions of the traction and auxiliary drives of a vehicle. It is a particular object to construct such a transmission so as to provide suitable ground clearance.

Other objects and features of the invention will be apparent from the description hereinbelow.

Briefly, the invention comprises the combination of a main driving shaft and an auxiliary power driving shaft and a variable ratio belt drive together with an arrangement of gears and clutches, including reversing gears, whereby either or both shafts may be under power and whereby the speed of the shafts may be controlled.

Figure 3:
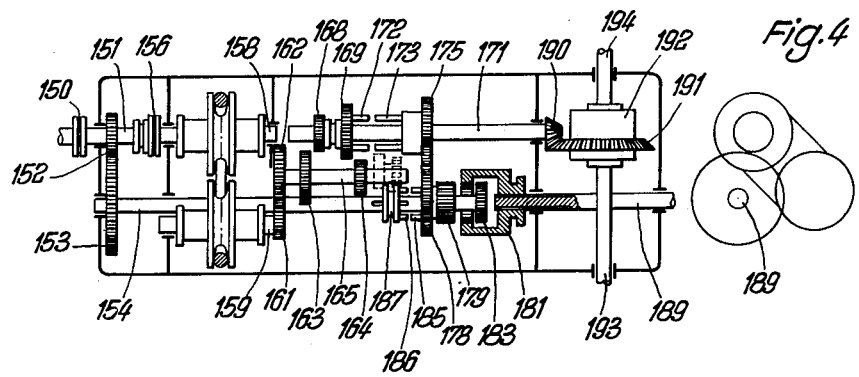
Figure 4:
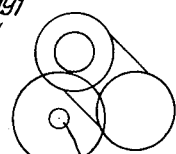
Figure 7:
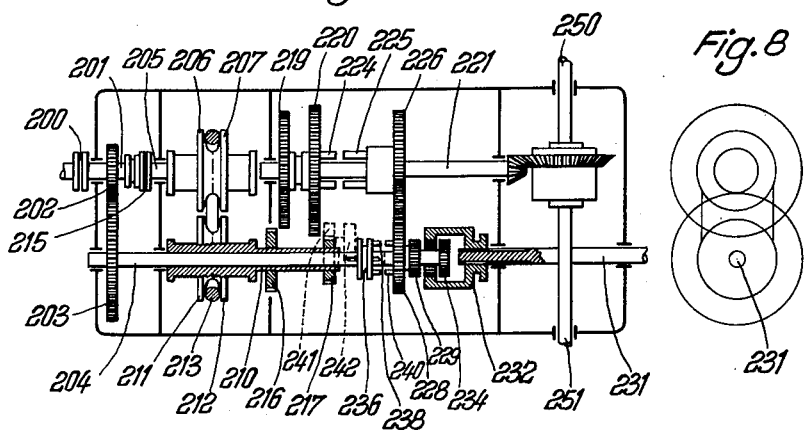
Figure 8:
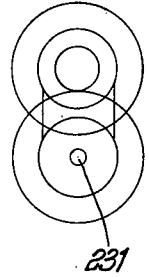

A detailed description now follows in conjunction with the appended drawing in which:

FIG. 1 is a plan view partially in section;
FIG. 2 is an end view of FIG. 1;
FIGS. 3 and 4 show plan and end views respectively of a modification;
FIGS. 5 and 6 show plan and end views respectively of a second modification, wherein FIG. 6 is an end view taken in the direction of the arrow A; and
FIGS. 7 and 8 are plan and end views respectively of a third modification.

Referring now to FIGS. 1 and 2, a main clutch 2 is coupled to an input shaft 3 on which is keyed a gear 4 which meshes with a gear 5 fixed on a shaft 6 which transmits torque to an auxiliary power shaft as will presently appear. A second clutch 7 is disposed to transmit torque to a primary shaft 10 of a vari-pitch drive comprising the disks 8 and 9. A secondary shaft 12 of the traction drive together with driving disks 13 and 14 are mounted in a housing 11. Disks 13 and 14 are in driving connection with disks 8 and 9 through an endless belt 16. Shaft 12 carries a gear 17 in continuous mesh with a counter shaft 19.

Speed changers are determined by a pair of gears 20 and 21 fixed on counter shaft 19, in conjunction with gears 24 and 25 slidably keyed to an output shaft 23. Thus, gear 20 can mesh with gear 24 or gear 21 can mesh with gear 25. It will be understood that gears 24 and 25 are integrally connected with each other and with a set of clutch teeth 29 engageable with a set of clutch teeth 26 of a gear 28 which runs free on drive shaft 23. Gear 28 is restrained against axial motion and is in continuous mesh with a gear 30 carried on shaft 6. Clutch teeth 32 of gear 30 are engageable with clutch teeth 34 of a trip sleeve 35 slidably keyed to shaft 6.

Integral with gear 30 is a gear 37. A clutch element 40 having a wall provided with internally facing teeth as shown is slidably splined to the auxiliary power shaft 39 and will be understood to be engageable with gear 37 or with a gear 42 fixed at the end of shaft 6. Shaft 23 can transmit torque via pinion 44 and differential 45 to the axles 46 and 47 of the vehicle wheels.

Gears 48 and 49 are utilized for reverse drive being carried on a shaft 50. Gear 49 is in continuous mesh with a gear 51 keyed to counter shaft 19. Gear 48 can be made to mesh with gear 25 with simultaneous meshing of clutch teeth 26 and 29 of gears 28 and 25 respectively.

FIG. 2 shows the arrangement of the shafts illustrating the compactness of the arrangement.

The mode of operation is as follows:

Rotation of shafts 6 and 39 for auxiliary power is effected, while the traction drive is disengaged, through gears 4 and 5 and clutch element 40 meshing with gear 42. At this time clutch 7 is disengaged so that power is not transmitted to the vehicle wheels via the belt drive, etc. When the vehicle wheels are to be powered simultaneously with the auxiliary shaft 39, clutch 7 is engaged and power is then transmitted via shaft 10, the endless belt drive, gears 17 and 18, and gears 21 and 25 which are at that time brought into mesh. In this instance clutch teeth 29 are brought into mesh with clutch teeth 26 thus rotating the freely rotative gear 28 which in turn rotates the gear 30 to effect rotation of gear 37. Clutch element 40 being assumed to be moved to the left as viewed on FIG. 1 to couple with gear 37 effects rotation of auxiliary output power shaft 39. The speed of shaft 39 then, of course, depends on the ratios of the gears involved and on the setting of the vari-pitch endless belt drive.

From the above description it will be apparent that auxiliary power can be obtained while the vehicle is stationary by releasing clutch 7 and engaging trip clutch 35 and clutch element 40, or simultaneous auxiliary power and vehicle moving power can be obtained by engaging clutch 7 and the gears driven thereby. It will also be noted that vehicle drive can be effected with clutch 7 disengaged via shaft 6, gear 30, gear 28, clutch teeth 26 and 29, gears 24 and 25 which are keyed to shaft 23, and thence to the differential 45.

To reverse the rotation of the auxiliary power shaft, the driving gear is reversed via gear 51, and gears 49 and 48 on the reverse gear shaft 50, and thence via gear 25. In this instance, clutch teeth 29 of gear 25 mesh with clutch teeth 26 of gear 28.

While in the form of the invention shown in FIGS. 1 and 2 the auxiliary power shaft 39 and the primary drive shaft 10 together with the shafts 12 and 19 are substantially coplanar, in the form of the invention shown in FIGS. 3 and 4 an offset shaft arrangement is disclosed. Thus, in this modification a clutch 150 is provided on an input shaft 151 which can be coupled with a shaft 158 via a main clutch 156. Input shaft 151 continuously drives gears 152 and 153 to effect rotation of a shaft 154. The vari-pitch drive is powered through shaft 158 to rotate shaft 159, whereby shaft 158 represents the primary shaft of the vari-pitch drive. The secondary shaft 159 drives a gear 161 in mesh with a gear 162 to effect rotation of a shaft 165 on which are a pair of fixed gears 163 and 164. A pair of integral gears 168 and 169 are carried on an output drive shaft 171 and are slidably splined thereon so that they can be shifted to effect engagement of gear 168 with gear 163 or gear 169 with gear 164. The gear train 168, 169 has clutch teeth 172 which are engageable with clutch teeth 173 of a gear 175 freely rotative on shaft 171 and in constant mesh with a gear 178 which is integral with a gear 179 to form a gear train which is freely rotative but axially fixed on shaft 154.

A clutch element 181 having internal teeth as shown is slidably splined on the auxiliary power shaft 189 and can be brought to engage gear 179 or a gear 183 fixedly held on the end of shaft 154. Gear 178 is provided with clutch teeth 185 which can engage clutch teeth 186 of a trip sleeve 187 slidably splined on shaft 154.

The vehicle drive shaft 171 carries a pinion 190 engaging the bevel gear 191 to transmit torque via a differential 192 to the axles 193, 194.

The mode of operation of the above described arrangement is the same as that set forth for the form shown in FIGS. 1 and 2, including the reversing gear arrangement. FIG. 4 shows the offset arrangement of the shafting of the transmission.

The modification shown in FIGS. 5 and 6 comprises an input shaft 303 which can be coupled to a motor via a main clutch 302 and which carries a pair of gears 304 and 305 fixed thereto and each forming a part of a constant transmission. Gear 304 meshes with a gear 309 fixed on a secondary shaft 307 while gear 305 is in constant mesh with a gear 312 fixed at the end of a shaft 311. Shaft 307 can be connected to a shaft 308 by way of a clutch 314 driven by gear 309.

A vari-pitch drive is utilized consisting of two pairs of driving disks 316, 317, and 318, 319 and a transmission belt 320. Disks 316, 317 are mounted on shaft 308 while disks 318 and 319 are mounted on a shaft 322 to which is keyed a gear 323 in constant mesh with a gear 324 secured to a shaft 325, all located in a housing 310. A gear 327 is likewise keyed to shaft 325 and is in constant mesh with a gear 331 keyed to a shaft 330. As is apparent from FIGS. 5 and 6, the input shaft 303 passes between the runs of belt 320 to effect compactness.

Shaft 325 carries a rim gear 328 which can be engaged by an internal gear 332 slidably splined on output drive shaft 333. A gear 340 integral with gear 332 is engageable with a gear 341 fixed to shaft 330. Further, gear 340 serves as an intermediary for reverse drive in conjunction with a reverse drive shaft 342 and fixed gears 343 and 344 carried by that shaft.

An auxiliary power drive shaft 350 is carried in housing 310 and has slidably splined thereto a clutch element 351 having the ring gear 352 which is engageable with a gear 353 fixed at the end of shaft 311 all with a gear 355 integral with a gear 354 which latter gears are axially fixed but freely rotative on shaft 311. The integral gear train 354, 355 is provided with clutch teeth 356 engageable by the teeth of a trip clutch 357 slidably keyed to shaft 311.

In the operation of the modification above described, the vehicle drive shaft 333 may be maintained stationary while the auxiliary power shaft 350 may be rotated via shaft 303, gears 305 and 312, and shaft 311 upon engagement of clutch element 351 with gear 353, clutch 314 being disengaged at this time. If clutch 314 is brought into engagement and gear 340 moved to engage gear 354, reduced speed drive for the vehicle is achieved. On the other hand, if ring gear 332 is brought into engagement with gear 328, direct drive is effected. In either instance, auxiliary power can be effected by means of clutch element 351 being moved to mesh ring gear 352 with gear 355.

The arrangement above described makes it possible to effect speed changes of the vehicle and of shaft 311 should the vari-pitch drive break down. Thus, the axially movable and freely rotative gear 354 on shaft 311 is provided with the teeth 356 which can be meshed with teeth of a trip clutch 357 slidably keyed to shaft 311, as hereinabove described. Accordingly, a driving connection can be established between shafts 311 and 333 provided gear 340 is shifted to mesh with gear 354.

FIG. 6 illustrates the coplanar arrangement of the shafting to effect a compact transmission block.

In the form of the invention shown in FIGS. 7 and 8, an input shaft 201 is driven by a motor (not shown) through a main clutch 200 and drive shaft 204 via the constant mesh gears 202 and 203. The vehicle drive comprises the primary shaft 205 carrying disks 206 and 207 of a vari-pitch speed drive which includes an endless belt 213 and disks 211 and 212 carried on a sleeve 210 which is freely rotative on shaft 204. Sleeve 210 has keyed thereto a pair of spaced gears 216 and 217 engageable by gears 219 and 220, respectively which latter gears form an integral gear train carried on shaft 221 and being axially shiftable with respect thereto. Gear train 219, 220 has clutch teeth 224 engagable with the clutch teeth 225 of a gear 226 which is freely rotated on shaft 221 which is the drive shaft for the vehicle. Gear 226 is in constant engagement with a gear 228 which is integral with a gear 229 to constitute a gear train freely rotative on shaft 204. A clutch element 232 is slidably splined to the auxiliary power shaft 231 and has an end wall provided with internal gear teeth as shown so as to be selectively engaged with gear 229 or a gear 234 secured at the end of shaft 204. A trip clutch 236 is slidably keyed to shaft 204 and has teeth 238 engagable with teeth 240 carried by gear 228.

Reversing gears 241 and 242 serve as intermediaries for reversing the rotation of the vehicle drive shaft 221 and the auxiliary power shaft 231, reverse gear 241 being in constant mesh with gear 217.

FIG. 8 shows the coplanar shafting arrangement, omitting the axles 250 and 251 for purposes of clarity. The compact arrangement provides advantageous ground clearance.

In operation, torque is transmited by shaft 201 to the vari-pitch drive comprising the disks 206, 207, belt 213, and disks 211, 212, thence through sleeve 210 to the gears 216 and 217 either of which may be engaged depending upon the position of the gear train 219, 220. Thus, the gear 219 can mesh with the gear 216 or the gear 220 can mesh with the gear 217 to drive shaft 221 at a particular speed. When gear 220 is coupled to gear 226 via the clutch teeth 224 and 225 and the clutch element 232 meshes with gear 229, auxiliary shaft 231 has a speed of rotation dependent upon the change speed gear. If clutch 215 is disengaged and clutch element 232 is coupled with gear 234, direct drive is achieved for the auxiliary shaft through coupling of teeth 238 and 240. Also, power transmission to the axles can be effected via gears 202 and 203 and shaft 204 by coupling that shaft to gear 240 via trip clutch 236. At this time teeth 224 and 225 are engaged in order to complete the drive to shaft 221.

Having thus described my invention I am aware that many changes may be made without departing from the spirit thereof and accordingly I do not seek to be limited to the precise illustrations herein given except as set forth in the appended claims.

I claim:

1. In a transmission for motor vehicles, an input shaft, a vari-pitch drive, said vari-pitch drive being drivable by said input shaft, a change gear system, said change gear system being drivable by said vari-pitch drive, and an output shaft connected to said change gear system, for a vehicle axle drive system, an output shaft means for an auxiliary power device, and clutch means for driving said auxiliary power shaft means directly from said input shaft or through said vari-pitch drive and change gear system, said vari-pitch drive comprising a pair of spaced belt runs, said input shaft passing through the space between said runs, the axes of all said shafts being parallel.

2. In a combination as set forth in claim 1; including a clutch intermediate said input shaft and said vari-pitch drive for disconnecting said vari-pitch drive from said input shaft.

3. In a combination as set forth in claim 1, said input shaft and said output shaft for said axle drive being in co-axial alignment and said shaft means for said auxiliary power device being parallel thereto.

4. In a combination as set forth in claim 1, said shaft means for said auxiliary power drive carrying a clutch and being comprised of two co-axial shaft elements, a gear of said change gear system being carried by one of said elements, said latter clutch being disposed to connect the other element to said gear or to said one element, whereby said power device may be driven directly from said input shaft or through said change gear system by operation of said latter clutch.

5. In a combinaion as set forth in claim 4, said input shaft and said output shaft for said axle drive system being in co-axial alignment and said auxiliary power shaft elements being parallel thereto.

6. In a transmission for motor vehicles, an input shaft, a vari-pitch speed change drive means powered thereby, change speed gear means driven by said vari-pitch drive, and having an output power shaft, an auxiliary power shaft and means for optionally connecting said vari-pitch drive means to said auxiliary shaft, clutch means independent of said vari-pitch drive means for optionally effecting direct drive of said auxiliary power shaft from said input shaft, said vari-pitch drive means comprising a pair of pulleys interconnected by an endless belt having spaced runs, said input shaft being disposed to pass between the runs of said belt.

7. In a transmission for motor vehicles, an input shaft, a vari-pitch speed change drive means powered thereby, change speed gear means driven by said vari-pitch drive and having an output power shaft, an auxiliary power shaft and means for optionally connecting said vari-pitch drive means to said auxiliary shaft, clutch means independent of said vari-pitch drive means for optionally effecting direct drive of said auxiliary power shaft from said input shaft, said vari-pitch drive means comprising a pulley, said pulley being mounted on a sleeve and keyed thereto, said change speed gear means comprising a gear carried on said sleeve, said clutch means comprising a drive shaft, said sleeve being rotatively mounted on said drive shaft, and clutch means operable to connect said drive shaft to said auxiliary power shaft.

8. In a transmission for motor vehicles, an input shaft, a vari-pitch speed change drive means powered thereby, change speed gear means driven by said vari-pitch drive, an auxiliary power shaft and means for optionally connecting said vari-pitch drive means to said auxiliary shaft, clutch means independent of said vari-pitch drive means for optionally effecting direct drive of said auxiliary power shaft from said input shaft, including an output drive shaft for propelling said vehicle and being connected to said change speed gear means, said input shaft and said output drive shaft being coaxial, including means for coupling said output drive shaft to a vehicle axle.

9. In a transmission for motor vehicles, an input shaft, a vari-pitch speed change drive means powered thereby, change speed gear means driven by said vari-pitch drive and having an output power shaft, an auxiliary power shaft and means for optionally connecting said vari-pitch drive means to said auxiliary shaft, clutch means independent of said vari-pitch drive means for optionally effecting direct drive of said auxiliary power shaft from said input shaft, including an output drive shaft and additional clutch means carried on said output drive shaft for effecting driving torque from said input shaft through said vari-pitch drive means, or from said auxiliary power torque transmission means.

10. In a transmission for motor vehicles, an input shaft, a vari-pitch speed change drive means powered thereby, change speed gear means driven by said vari-pitch drive, an auxiliary power shaft and means for optionally connecting said vari-pitch drive means to said auxiliary shaft, clutch means independent of said vari-pitch drive means for optionally effecting direct drive of said auxiliary power shaft from said input shaft, including an output drive shaft for propelling said vehicle and being connected to said change speed gear means, said input shaft and said output drive shaft being coaxial, said input and auxiliary power shafts being co-planar, said vari-pitch speed change drive means being a traction drive comprising disk pairs and a friction belt therebetween, one of said disk pairs being driven by said input shaft, a pinion driven by the other of said disk pairs, a gear of the change speed gear means driven by said pinion, the line between centers of rotation of said disk pairs being at an angle to the plane of said input and output drive shafts, including means for coupling said output drive shaft to a vehicle axle.

11. In a transmission for motor vehicles, an input shaft, a vari-pitch speed change drive means powered thereby, change speed gear means driven by said vari-pitch drive and having an output power shaft, an auxiliary power shaft and means for optionally connecting said vari-pitch drive means to said auxiliary shaft, clutch means independent of said vari-pitch drive means for optionally effecting direct drive of said auxiliary power shaft from said input shaft, said auxiliary power shaft comprising two coaxial shaft elements, additional clutch means for connecting said elements, a sleeve freely rotative on one of said elements and driven by and carrying elements of said vari-pitch means, said sleeve having gear means forming a portion of said change speed gear means.

12. In a transmission for motor vehicles, an input shaft, a vari-pitch speed change drive means powered thereby, change speed gear means driven by said vari-pitch drive and having an output power shaft, an auxiliary power shaft and means for optionally connecting said vari-pitch drive means to said auxiliary shaft, clutch means independent of said vari-pitch drive means for optionally effecting direct drive of said auxiliary power shaft from said input shaft, including an output drive shaft for propelling said vehicle, said input shaft and said output drive shaft being coaxial, and including a countershaft for said speed change gear means, support means whereby said countershaft, said input shaft, said output drive shaft, and said auxiliary power shaft are substantially co-planar, including means for coupling said output drive shaft to a vehicle axle.

13. In a device of the class described, an input shaft, a vari-pitch speed change drive means powered thereby, change speed gear means driven by said vari-pitch drive, an auxiliary power shaft and means for optionally connecting said vari-pitch drive means to said auxiliary shaft, clutch means independent of said vari-pitch drive means for optionally effecting direct drive of said auxiliary power shaft from said input shaft, including a clutch for said input shaft to selectively connect or disconnect said input shaft to said vari-pitch drive means, said vari-pitch drive means comprising a belt drive, including an output drive shaft for propelling said vehicle and being connected to said change speed gear means, said input shaft and said output drive shaft being coaxial, including means for coupling said output drive shaft to a vehicle axle.

14. In a device of the class described, an input shaft, a vari-pitch speed change drive means powered thereby, change speed gear means driven by said vari-pitch drive, an auxiliary power shaft and means for optionally connecting said vari-pitch drive means to said auxiliary shaft, clutch means independent of said vari-pitch drive means for optionally effecting direct drive of said auxiliary power shaft from said input shaft, including a clutch for said input shaft to selectively connect or disconnect said input shaft to said vari-pitch drive means, said vari-pitch drive means comprising a belt drive, including an output drive shaft for propelling said vehicle and being connected to said change speed gear means, said input shaft and said output drive shaft being coaxial, including additional clutch means carried on said output drive shaft for effecting driving torque from said input shaft through said vari-pitch drive means, or from said auxiliary power torque transmission means, including means for coupling said output drive shaft to a vehicle axle.

15. In a transmission for motor vehicles, an input shaft, a vari-pitch speed change drive means powered thereby, change speed gear means driven by said vari-pitch drive, an auxiliary power shaft and means for optionally connecting said vari-pitch drive means to said auxiliary shaft, clutch means independent of said vari-pitch drive means for optionally effecting direct drive of said auxiliary power shaft from said input shaft, including an output drive shaft and further including additional clutch means carried on said output drive shaft for effecting driving torque from said input shaft through said vari-pitch drive means, or from said auxiliary power torque transmission means, including means for coupling said output drive shaft to a vehicle axle, said output drive shaft being connected to said change speed gear means.

16. In a device of the class described, an input shaft, a vari-pitch speed change drive means powered thereby, change speed gear means driven by said vari-pitch drive, an auxiliary power shaft and means for optionally connecting said vari-pitch drive means to said auxiliary shaft, clutch means independent of said vari-pitch drive means for optionally effecting direct drive of said auxiliary power shaft from said input shaft, including a clutch for said input shaft to selectively connect or disconnect said input shaft to said vari-pitch drive means, said vari-pitch drive means comprising a belt drive, including an output drive shaft connected to said change speed gear means for propelling said vehicle, said input shaft and said output drive shaft being coaxial, including additional clutch means carried on said output drive shaft for effecting driving torque from said input shaft through said vari-pitch drive means, or from said auxiliary power torque transmission means, including clutch means for connecting said auxiliary power shaft to said torque transmission means or to said change speed gear means.

References Cited in the file of this patent

UNITED STATES PATENTS

| | | |
|---|---|---|
| 1,756,971 | Brown | May 6, 1930 |
| 1,990,237 | Lloyd | Feb. 5, 1935 |
| 2,288,254 | Rich et al. | June 30, 1942 |
| 2,621,545 | Karig | Dec. 16, 1952 |

FOREIGN PATENTS

| | | |
|---|---|---|
| 740,071 | Germany | Oct. 11, 1943 |